Jan. 15, 1935.  S. RUPPRICHT  1,987,798
THERMAL INSULATING MATERIAL
Filed May 19, 1931

INVENTOR
Siegfried Ruppricht
BY
ATTORNEY

Patented Jan. 15, 1935

1,987,798

UNITED STATES PATENT OFFICE 1,987,798

THERMAL INSULATING MATERIAL

Siegfried Ruppricht, New York, N. Y.

Application May 19, 1931, Serial No. 538,502

6 Claims. (Cl. 154—45)

This invention relates to a thermal insulating material and method of making the same and has for an object the production of a cheap and efficient thermal insulating material adapted to be easily and cheaply applied and suitable for a large number of uses, such as the insulation of hot and cold piping, boilers, hot water heaters and the like, or for any use where it is desirable to prevent heat transfer.

Another object is to provide an insulation that is light in weight and particularly suitable for the insulation of refrigerating apparatus such as household refrigerators and the construction of insulating walls in abattoirs and other places used for the storage of food products where a non-absorbent odorless insulation is necessary that will be unaffected by time.

Another object is to provide an insulation in sheet form that can be readily manufactured in large quantities and yet have uniform characteristics as to its mechanical and thermatic qualities.

Another object is to provide an insulating material in sheet form that can be readily built up into a stack, layer or wall of any desired thickness, the completed wall as a whole being highly efficient both as to conductive and convection losses.

A further object is to so form a sheet of material—particularly thin metal sheets such as tin or aluminum foil or the like—that they will be stiffened in all directions so that they may be easily handled and stacked to form a wall of insulation as hereinafter described.

This stiffening process also automatically results in each sheet being provided with a predetermined number of contact points as the embossing or other means employed to stiffen the sheet will raise certain portions thereof higher than others, thus predetermining the number of contacts that the sheet will make when laid up in a stack with other sheets.

In the accompanying drawing.

Figure 1:
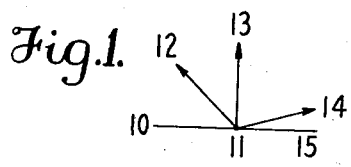
Figure 1 is a diagram illustrating the emissivity of insulating sheets.

The materials now commonly employed for insulation are cork, asbestos, wool and other substances more or less porous and in many cases hygroscopic. Thin sheets of material slightly separated from each other have also been used to form walls, the air between the sheets serving as an insulator; metal sheets have been used in a like manner and metal foil crumpled by hand without definite regard to its form has been employed.

Where crumpled metallic sheets have been used heretofore, it has been customary to first crumple and then straighten out the sheets after crumpling, and then laying or rolling the sheets around the object to be insulated. Obviously, all sheets cannot be crumpled alike and therefore the ultimate quality of the insulating wall cannot be definitely predetermined. Furthermore, this method is very inefficient as compared with the method of definitely pre-forming the sheets herein disclosed.

In carrying out this invention metal sheets are preferable, but it will be obvious that sheets of other material can be used, proper precaution being taken to make such material non-hygroscopic and to select material that will tend to prevent rapid conduction. However, thin metal sheets of copper, lead, tin or aluminum foil or sheets of cardboard or paper with one or both surfaces metallized are preferable.

As the conductivity of still air is lower than that of any commercial insulating material, it will serve as an ideal insulator provided radiation and convection can be checked. That is the function of insulating material and it has been found that thin metal foils accomplish this result.

By placing a sufficient number of thin metal foils in the path of the heat, radiation is reduced as the use of the foils checks radiation to such an extent compared with the quantity of the foil used that the high conductivity of the foil is not serious.

It has been found that thin aluminum foil sheets spaced ½" apart and placed in the path of heat will insulate as well as any known material of cellular structure, such as cork. At this ½" spacing the convection with smooth foils is quite high.

Therefore it has been customary to fill the space between the smooth foils with layers of foils that have been crumpled and then smoothed again to a certain extent, the crumpling serving to reduce convection. While this results in increased insulation efficiency, the application of the crumpled foil is difficult and expensive where mass production is necessary and the cost is high. Crumpled foils sag and are difficult to assemble and the characteristics of the finished wall vary and cannot be definitely predetermined.

The present invention makes possible the use of thin sheets of insulation, preferably metal sheets or foils in connection with the mass production of devices, such as refrigerator cabinets or the like, as it eliminates the difficulties and high cost heretofore met with in handling and assemblying these foils, and the thermal characteristics of the finished wall of insulation can be definitely determined.

In order to obtain the highest possible efficiency it is necessary to consider the emissivity of the insulating material and to so arrange it that conduction losses through the body of the material itself are reduced to a minimum. In order to illustrate this reference is made to Figure 1, in which the numeral 10 denotes a theoretically perfect "black body" and the numeral 11 denotes a point of heat emission therefrom, the heat flowing in the direction of the vector points 12, 13, 14. In this case the total emission E will be $$E = \pi E_n$$

Where $E_n$ = the specific emissivity of the material in the direction of vector point 13 which is 90° to the surface of the material. The heat at any one of the vector points 12, 13, 14 will be found substantially equal.

Now if the black body 10 is replaced by a suitable material, such for example as aluminum foil of a thickness .00028", the total emission will then be $$E = \frac{4}{3}\pi E_n,$$

from which it is evident that the heat will no longer be uniform at the vector points but that the smaller the angle of incidence the greater the emissivity. For example, in Figure 1, assuming that the emissivity of the foil in the direction of the vector point 13 is 10 units, the emissivity of the foil towards the point 14 which is only 15° from the surface 15 will be approximately 20 units.

It is therefore apparent that the relative angular position of the foil surfaces in a built up wall or stack of insulation is of importance in order to insure maximum efficiency in the completed stack.

Figure 3:
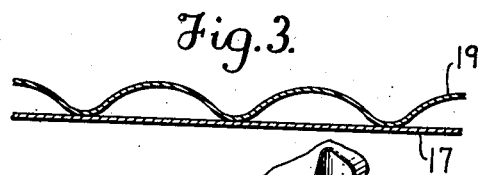
Figure 3 is a sectional view on the line $x-y$, Fig. 2.
Figure 2:
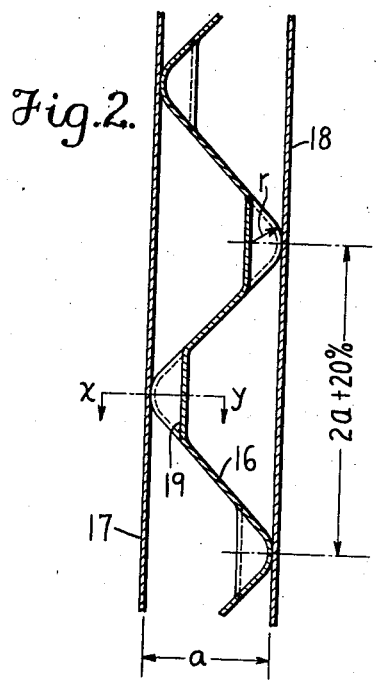
Figure 2 is a cross section of two plain and one corrugated insulating sheets forming a wall of insulation.
Figure 4:
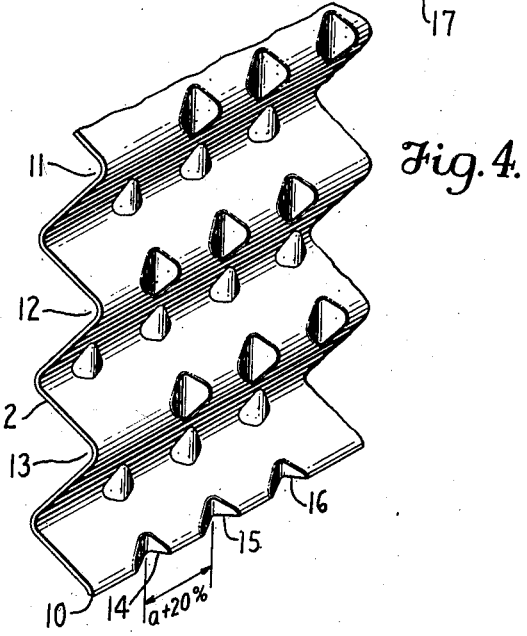
Figure 4 is an isometric view of the corrugated sheet shown in Figures 2 and 3.

Bearing in mind the foregoing and at the same time in order to reduce conductivity and convection to a minimum it has been found that the space "a" between any two straight sheets 17, 18, Figure 2, may advantageously be divided by a third sheet 19 formed as shown in Figures 2, 3 and 4, in which the spacing between corrugations is 2a+20%. This avoids sharp angles which are undesirable because they tend to reduce the rigidity of sheet 19 and to increase the radiation therefrom. The radius "r" of the bends in the sheet 19 may preferably be $$r = \frac{a}{4}$$

as this enables the flat portions 16 of the sheet to lie at an angle of approximately 45° to the sheets 17 and 18.

Assuming that the corrugations in sheet 19 run horizontally, convection will be satisfactorily checked, but the arrangement shown in Figure 2 is open to the objection that there is too much contact between the bends of the corrugations in sheet 19 and the straight sheets adjacent thereto and therefore excessive conduction will occur.

Obviously the corrugations in sheet 19 cannot be run vertically or convection would be increased. It is therefore necessary to superimpose a second set of corrugations upon the first set or pattern just described. The first pattern may be considered as transverse corrugations. The second set of corrugations may be considered as traversing the first set and is hereinafter termed the "second pattern". In other words the corrugations cross each other to produce what may be termed a "waffle pattern". However, the character of this pattern is most important as upon this depends the reduction of conduction and convection to a minimum.

The second pattern should preferably have its corrugations at an angle to those of the first pattern and Figure 3 is a section on line x—y of Figure 2, showing the second pattern superimposed on the first pattern.

The waves or bends of the second pattern are spaced apart a+20%, but the depth of these waves should be (for the example hereinafter given) not more than ⅛ of an inch. The purpose of having this shallow depth of wave in the second pattern is to prevent air convection across the top of the waves of the first pattern.

Figure 4 is an isometric view of the sheet 10 shown in Figures 2 and 3 and shows the complete surface of the sheet.

Figure 5:
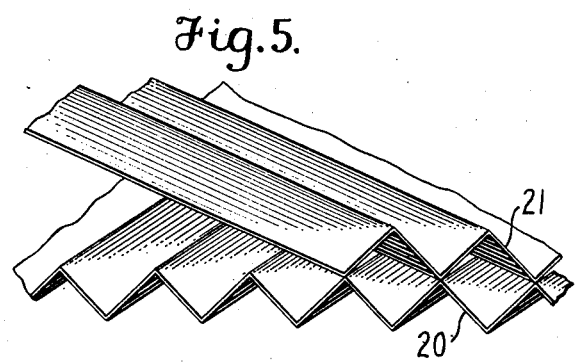
Figure 5 is an alternate form of corrugated sheet.

Bearing in mind the requirements heretofore referred to in respect to the angular relation of the corrugations to the associated plain sheets, a wide variety of patterns may be used, such as that shown in Figure 5, in which the sheets 20 and 21 are simply pleated as shown and arranged with the pleats cross-wise. The angular relationship of the pleats to each other can be varied within wide limits.

The method of making the insulating sheets will now be described. The following procedure is given by way of illustration but may be varied within wide limits. The exact procedure will depend upon the specific purpose for which the insulation is used and is immaterial if the resultant product is suitable for the desired purpose. The following example is given as a suitable method of producing insulating for use in connection with a refrigerator wall as hereinafter described.

Assuming that the material is the aluminum foil hereinbefore mentioned and of suitable width, say 24" (such foil is ordinarily furnished by the manufacturers thereof in rolls), a roll of foil is suitably mounted so that it may be easily unrolled and the foil is passed between suitable corrugating or embossing rolls to cause it to assume the desired first pattern. If desired, the pattern can be pressed into the foil by means of a suitable flat die or stamp and if desired, the foil may be handled in flat sheets instead of being taken off the roll.

The foil having been processed in any suitable manner, such as those just described, may be rerolled or stacked in flat sheets.

If the foil has only been corrugated with the first pattern the second pattern can now be put on by a suitable corrugating or embossing roll. Obviously both patterns can be impressed on the roll at the same time.

The corrugated sheets having been made by the method just described may now be used to construct an insulating wall and by way of illustration, such a wall suitable for application to a small refrigerator will be described.

Figure 6:
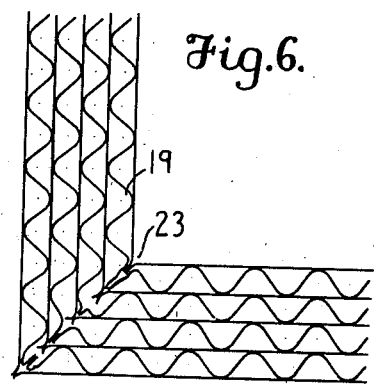
Figure 6 is a sectional view of a stack or wall of insulation consisting of plain and corrugated sheets.

The wall about the food chamber of such refrigerators is usually about 3" thick and may be constructed as shown in Figure 6 wherein a plurality of flat sheets 22 are placed between the corrugated sheet 19 as shown.

Care should be taken that the corrugations are arranged in order to reduce conduction, the corrugations being arranged preferably as shown in Figure 6. The stack is beveled on the corner 23 or the entire square of insulation surrounding the food chamber may be made on a suitable form.

The completed body of insulation is placed about the food chamber and the outside casing put in place, care being taken to see that the outside casing is properly sealed against the ingress of air and moisture.

By reason of the patterns impressed on the sheets 19 the entire body of insulation is stiffened in all directions and held firmly in place so that it will not warp, bend away from the casing or sag towards the bottom thereof. The construction will stand the handling incident to assembly and the jarring encountered in shipment and use. The necessity for intermediate supports and spacers necessary if only flat sheets were used and the necessity of holding said sheets at the corners by means of battens or the like, all of which introduce conduction losses, is eliminated by this construction which is rigid enough to support its own weight even where the side wall of the refrigerator has an area of several square feet.

The foregoing illustration of how a wall of thermal insulation is constructed is given merely by way of example, the preferred method of assembly complete as to details such as the necessary procedure when handling the corrugated sheets in order that they will not be crushed while being stacked or assembled with the plain sheets, the joining of the corners where top, bottom and side stacks are used, and other details of assembly using this insulation constitute a separate invention and form the subject matter of another application for patent so they are not herein described in detail.

What is claimed is:

1. An insulator comprising a thin metallic sheet formed in a predetermined wave pattern in which the distance between adjacent peaks of the wave is equal to approximately twice the height of the pattern plus twenty percent of said height.

2. An insulating wall including a plurality of sheets having their surfaces formed in a definite wave pattern in which the distance between the adjacent peaks of the wave is equal to approximately twice the height of the pattern plus twenty percent of said height and having said patterns angularly disposed to each other.

3. An insulator comprising a thin metallic sheet, the surface of which is broken up into a series of angular planes connected by radial curves forming a wave pattern in which the radius of the curves is equal to one fourth the height of said pattern.

4. An insulator, according to claim 3, in which a series of indentations are superimposed on the radial curves.

5. An insulator as claimed in claim 1 wherein a second wave pattern is superimposed upon the first pattern formed in the sheet angular relative to first wave pattern. thereby stiffening the metallic sheet.

6. An insulator comprising a thin metallic sheet preformed into a series of angular planes connected by radial curves constituting a wave pattern in which the radius of each of the curves is equal to 2⅕ times the height of said pattern, and a series of indentations in said curves for further stiffening said sheet and reducing the contact area of said sheet when the same is applied to a body to be insulated.

SIEGFRIED RUPPRICHT.